United States Patent Office 3,057,847
Patented Oct. 9, 1962

3,057,847
PYRROCOLINE DYESTUFFS
Eduard Moser, Basel, Switzerland, assignor to Ciba Limited, Basel, Switzerland, a company of Switzerland
No Drawing. Filed Nov. 21, 1960, Ser. No. 70,374
Claims priority, application Switzerland Nov. 26, 1959
6 Claims. (Cl. 260—156)

This invention provides dyestuffs of the general formula (1)
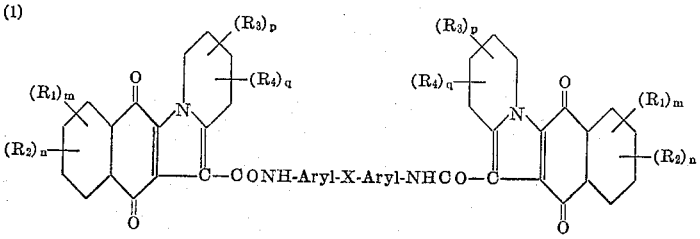

in which $R_1$, $R_2$, $R_3$ and $R_4$ each represents a hydrogen atom or a substituent not imparting solubility in water and any two of the substituents in ortho-position relatively to one another together with the vicinal carbon atoms of the basic structure may form a ring, $m$, $n$, $p$, and $q$ each represents the whole number 1 or 2, "Aryl" represents an aryl radical free from groups imparting solubility in water.

The invention also provides a process for the manufacture of the dyestuffs of the above Formula 1, wherein two molecular proportions of a halide of 2:3-phthaloyl-pyrrocoline-1-carboxylic acid of the formula (2)
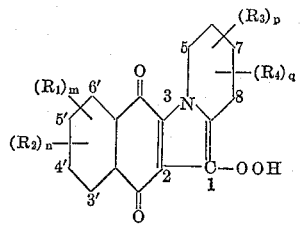

(the numbering of the pyrrocoline ring is that used in "Patterson's Ring Index"), in which $R_1$, $R_2$, $R_3$, $R_4$, $m$, $n$, $p$ and $q$ have the meanings given above, are condensed with one molecular proportion of a diamine free from groups imparting solubility in water and corresponding to the formula (3)          $H_2N$—Aryl—X—Aryl—$NH_2$ in which X and "Aryl" have the meanings given above.

In the phthaloyl-pyrrocoline carboxylic acids of the Formula 2 $R_3$ and $R_4$ are advantageously hydrogen atoms or simple substituents, such as halogen atoms or lower alkyl groups or $R_3$ and $R_4$, when they are in ortho-position relatively to one another, may together with the vicinal carbon atoms of the pyridine ring form an alicyclic, heterocyclic or aromatic ring. $R_1$ and $R_2$ are advantageously hydrogen atoms, or they may be halogen atoms, for example, chlorine or bromine atoms.

The 2:3-phthaloyl-pyrrocoline carboxylic acids of the Formula 2 can be obtained, for example, by the process described in U.S. Patent No. 2,877,230, patented March 10, 1959, to Robert S. Lang et al. by condensing a 2:3-dihalogen-, especially a 2:3-dichloro- or 2:3-dibromo-naphthoquinone with an acetoacetic acid alkyl ester and pyridine or a substitution product thereof, for example, α-picoline, and hydrolysing the alkyl ester so obtained to form the carboxylic acid. A suitable naphthoquinone, on account of the ease with which it can be obtained, is especially 2:3-dichloronaphthoquinone. However, there may also be used 2:3:5- or 2:3:6-trichloronaphthoquinone, 2:3-dibromonaphthoquinone or 2:3:6:7-tetrabromonaphthoquinone.

There are advantageously used the chlorides of the 2:3-phthaloyl-pyrrocoline carboxylic acids. These chlorides can be obtained from the carboxylic acids in known manner by treatment with an acid-chlorinating agent, for example, phosphorus trichloride, phosphorus pentachloride or phosphorus oxychloride, and more especially thionyl chloride.

The treatment with the acid-chlorinating agent is advantageously carried out in an inert organic solvent, such as dimethyl-formamide, a chlorobenzene, for example monochloro- or dichloro-benzene, toluene, xylene or nitrobenzene. When the last mentioned solvent is used the reaction can be accelerated by the addition of a small proportion of dimethylformamide.

In making the carboxylic acid halides it is generally of advantage first to dry the carboxylic acids which have been prepared in an aqueous medium or to free them from water azeotropically by boiling in an organic solvent. This azeotropic drying may, if desired, be carried out immediately before the reaction with the acid-chlorinating agent.

In the diamines of the above Formula 3 the aryl radicals may be, for example, naphthalene or diphenyl radicals, but are advantageously benzene radicals, which may contain substituents not imparting solubility in water, for example halogen atoms or alkyl or alkoxy groups. The bridge X may be, for example, a hetero-atom, such as an oxygen or sulfur atom, or a simple atomic grouping, for example, one of the nitrogenous groups —NH—, —N=N—, —NHCO—, NHCONH— or sulfur-containing groups such as —SO—, $SO_2$—, —$SO_2$—$CH_2$— or an aliphatic radical such as —$CH_2$—, —CO—,

—$CH_2CH_2$—, —CH=CH—, —$OCH_2CH_2O$—, or an aromatic radical such as

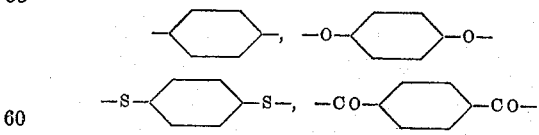

or a heterocyclic radical, such as the radical of the formula

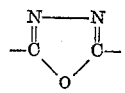

As examples there may be mentioned the following amines:

3:3'-diaminodiphenylmethane,
4:4'-diaminodiphenylmethane,
4:4'-diamino-3:3'-dichlordiphenylmethane, 3:3'-diamino-4:4'-dimethoxydiphenylmethane,
4:4'-diamino-2:2'-dichloro - 5:5' - dimethyldiphenylmethane,
4:4'-diamino-diphenyl oxide,
4:4'-diamino-diphenyl sulfide,
4:4'-diamino-diphenyl sulfoxide,
4:4'-diamino-diphenyl-sulfone,
3:3'- or 4:4'-diaminodiphenylmethane,
4:4'-diamino-2-methyl-5-methoxy-1:1'-azobenzene,
3:3'- or 4:4'-diphenyl-urea, and also the compounds of the formulae

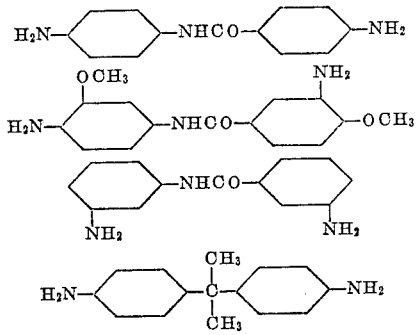

The condensation of the phthaloyl-pyrrocoline carboxylic acid halides with the diamines is advantageously carried out in an anhydrous medium. Under these conditions the reaction generally takes place easily at temperatures within the boiling range of the ordinary organic solvents, such as toluene, monochlorobenzene, dichlorobenzene, trichlorobenzenes, nitrobenzene and the like. In order to accelerate the reaction an acid-binding agent may be used, such as anhydrous sodium acetate, pyridine or anhydrous ammonia. The dyestuffs are generally obtained in very good yield and in a pure state. However, it may be of advantage for making especially pure dyestuffs first to isolate the acid chloride obtained from the carboxylic acid, and, if desired, to recrystallize the acid chloride. In most cases, especially when thionyl chloride is used as acid-chlorinating agent, however, it is possible without harm, and in some cases even with better results, to dispense with isolation of the acid chloride and to carry out the condensation in the reaction mixture in which the acid chloride has been formed.

The dyestuffs of the invention are useful for dyeing a very wide variety of materials, for example, they can be used as vat dyestuffs for dyeing cellulose fibers or animal fibers, such as wool or silk, or synthetic fibers such as polyamide or polyester fibers. The dyestuffs can also be sulfonated and used in that state for dyeing the aforesaid fibers, especially animal fibers. The dyestuffs of the invention are also suitable for all the usual purposes for which pigments are used, for example, for so-called pigment printing, that is to say, the printing method in which the pigment is fixed on a substratum, more especially on a textile fiber, or on another sheet-like structure such as paper, for example, wallpaper, or a fabric of glass fibers, by means of a suitable adhesive, such as casein, a hardenable synthetic resin, for example, a urea-formaldehyde or melamine-formaldehyde condensation product or a solution or emulsion of polyvinyl chloride or polyvinyl acetate or other emulsion, for example, an oil-in-water or water-in-oil emulsion. The pigments are also suitable for other purposes, for example, in the finely divided form for dyeing fibers on viscose or cellulose ethers or esters or of polyamides or polyurethanes in the spinning composition, and also for making colored lacquers or lacquer formers, solutions or products of acetyl-cellulose, nitrocellulose, or natural products of high molecular weight, such as gums or casein, or artificial resins, such as polymerization resin, for example, polyvinyl chloride, polyethylene, polypropylene, or polystyrene or condensation resins, for example, aminoplasts or phenoplasts, and also silicone or silicone resins. Furthermore, they can be used with advantage for making colored pencils, cosmetic preparations and laminated boards.

Owing to their chemical inertness and good resistance to heat the pigments of this invention can be dispersed in compositions or products of the kind mentioned above in the normal manner. This is advantageously carried out before the compositions or products have reached their final form. The pigments can be converted into a finely divided form by the known conditioning methods. The operations required for shaping, such as spinning, pressing, hardening, casting, sticking or the like, can then be carried out in the presence of the aforesaid pigments.

The pigments of this invention are distinguished by their excellent fastness to light and migration.

The following examples illustrate the invention, the parts and percentages being by weight.

*Example 1*

30.9 parts of 2:3-phthaloylpyrrocoline-1-carboxylic acid chloride—prepared as described in U.S. Patent No. 2,877,230, patented March 10, 1959, to Robert S. Lang et al., by heating 2:3-dichloro- or 2:3-dibromonaphthoquinone, acetoacetic ester and pyridine, hydrolysing the resulting 2:3-phthaloylpyrrocoline-1-carboxylic acid ethyl ester to form the carboxylic acid and reacting the latter with thionyl chloride—are stirred in 750 parts of anhydrous ortho-dichloro-benzene at 115° C.; after about 20 minutes a clear solution is obtained. The latter solution is treated within about 5 minutes with a solution heated at 100° C. of 9.9 parts of 3:3'-diaminodiphenylmethane in 100 parts of anhydrous ortho-dichlorobenzene and 2.5 parts of anhydrous pyridine. The mixture is heated to 140 to 145° C. and maintained at that temperature for about 10 hours, then allowed to cool to 100° C., filtered, and the resulting pigment is washed with ortho-dichlorobenzene heated at 100° C. until the solvent flows off substantially colorless. It is then washed with a small amount of methanol and then with hot water. The resulting pigment is dried in vacuo at 90 to 100° C. After having been rolled in polyvinyl chloride foils it produces a ruby shade of excellent fastness to migration.

When in this example 3:3'-diaminodiphenylmethane is replaced by an equivalent amount of 1-(3'-aminobenzoylamino)-3-aminobenzene, a dyestuff is obtained which dyes cotton from the vat claret tints, and on incorporation in polyvinyl chloride foils produces a bluish red, while 4:4'-diaminodiphenylsulfone produces a ruby shade, 4:4'-diaminodiphenyl ether a violet shade, 4:4'-diamino-1:1'-azobenzene a brown shade, 4:4'-diaminodiphenyl-amine a violet shade, 4:4'-diamino-2:2'-dichloro-5:5'-dimethyldiphenylmethane a neutral red shade, and 4:4'-diaminodiphenyldimethylmethane a bluish red shade.

*Example 2*

34.4 parts of 4'- or 5'-chloro-2:3-phthaloylpyrrocoline-carboxylic acid chloride melting at 206 to 212° C. (uncorrected)—prepared from 2:3:6-trichloro-1:4-naphthoquinone with acetoacetic acid ethyl ester and pyridine, followed by hydrolysis to yield the carboxylic acid (melting point 303 to 306°, uncorrected, with decomposition) and reacting the latter with thionyl chloride—are condensed as described in Example 1 with 9.9 parts of 4:4'-diaminodiphenylmethane. The resulting pigment colors polyvinyl chloride foils a reddish blue shade.

By using instead of 4:4'-diaminodiphenylmethane an equivalent amount of 4:4'-diamino-2-methyl-5-methoxy-1:1'-azobenzene and using the resulting pigment for coloring polyvinyl chloride foils an olive brown shade is obtained, while 3:3'-diamino-4:4'-dimethoxy-diphenylmethane produces a bluish red shade, 4:4'-diamino-3:3'-dichlorodiphenylmethane a ruby shade, and 1-(3'-aminobenzoylamino)-3-aminobenzene a pure violet shade.

*Example 3*

A suspension of 29.1 parts of 2:3-phthaloylpyrrocolinecarboxylic acid in 750 parts of anhydrous ortho-dichlorobenzene and 14.8 parts of thionyl chloride is heated within about 40 minutes to 130° C. and then heated for 2 hours at 130–135° C. In the course of 5 minutes the resulting solution is treated with a solution heated at 120° C. of 12.4 parts of 4:4'-diaminodiphenylsulfone in 100 parts of anhydrous ortho-dichlorobenzene and 2.5 parts of anhydrous pyridine. The mixture is heated for about 10 hours at 140° C., then allowed to cool to 100° C., and the precipitated pigment is filtered off and washed with ortho-dichlorobenzene heated at 100° C. until the washing liquor runs substantially colorless. The filter residue is then washed with a small amount of methanol and then with hot water. The pigment is dried in vacuo at 90 to 100° C. In polyvinyl chloride foils it produces a ruby coloration similar to that described in paragraph 2 of Example 1.

When 4:4'-diaminodiphenylsulfone is replaced by an equivalent amount of 1-(3'-aminobenzoylamino)-3-aminobenzene, a bluish red shade is obtained which is similar to that obtained as described in paragraph 1 of Example 1.

*Example 4*

65 parts of polyvinyl chloride, 35 parts of dioctylphthalate and 0.2 part of the pigment obtained as described in paragraph 1 of Example 1 are stirred together and then rolled to-and-fro for 7 minutes at 145° C. on a two-roller calender. A ruby foil of good fastness to light and migration is thus obtained. By using in addition to the above-mentioned quantity of dyestuff pigment 5 parts of titanium dioxide, a ruby pastel shade is obtained.

*Example 5*

0.25 part of the dyestuff described in paragraph 1 of Example 1 is ground for 24 hours in a rod mill with 40 parts of an alkyd-melamine stoving lacquer containing 50% of solids, and 4.75 parts of titanium dioxide. A thin layer of the resulting lacquer is brushed on an aluminum foil and stoved for one hour at 120° C. A ruby lacquer coat of good fastness to light is obtained.

*Example 6*

For the manufacture of a laminate the following component layers are prepared:

(a) Strong paper of unbleached sulfate cellulose (so-called kraft paper) is impregnated with an aqueous phenol-formaldehyde resin solution, pressed and dried.
(b) Paper of pure, chemically bleached cellulose containing zinc sulfide or titanium dioxide as filler is impregnated with an aqueous solution of dimethylolmelamine of 50% strength, pressed and dried at 100° C.
(c) 400 parts of a fancy paper of bleached cellulose containing zinc sulfide or titanium dioxide as filler are disintegrated in a Hollander with 10,000 parts of water. 30 parts of the pigment prepared as described in Example 1 are added to the paper pulp so obtained. The pigment is fixed by adding 16 parts of aluminum sulfate. The dyed fancy paper is impregnated with an aqueous solution of dimethylolmelamine of 50% strength, pressed and dried at 100° C.
(d) According to the quality of the laminate the fancy paper is protected with tissue paper of bleached special cellulose, weighing 40 grams per square meter. The tissue paper is likewise impregnated with an aqueous solution of dimethylolmelamine of 50% strength, pressed and dried at 100° C.

A sandwich is prepared from the papers thus treated, each measuring, for example, 2.75 m. by 1.25 m., in the following order: First 3 to 5 sheets of paper (a), one sheet of paper (b), one sheet of paper (c), and if desired one sheet of paper (d), and the sandwich is compressed between mirror-chromed plates for 12 minutes at 140 to 150° C. under a pressure of 100 kg. per sq. cm. The sandwich is then cooled to 30° and removed from the press, whereupon it displays on one side a bluish red shade having very good fastness to light.

*Example 7*

1 part of the dyestuff obtained as described in Example 1 by using as diamine 1-(3'-aminobenzoylamino)-3-aminobenzene is vatted in 100 parts of water containing 4 parts by volume of sodium hydroxide solution of 30% strength with 2 parts of sodium hydrosulfite at 45° C. The resulting stock vat is added to a solution of 4 parts by volume of sodium hydroxide solution of 30% strength and 2 parts of sodium hydrosulfite in 2000 parts of water. In the resulting dyebath 100 parts of cotton are dyed for one hour at 40 to 50° C. with addition of 10 parts of sodium chloride. The cotton is then squeezed, oxidised in air, rinsed, acidified, once more rinsed and soaped at the boil. A claret dyeing is obtained which has very good fastness properties.

What is claimed is:
1. A dyestuff of the formula

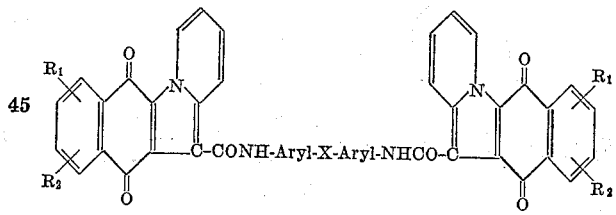

in which $R_1$ and $R_2$ each represents a member selected from the group consisting of a hydrogen atom and a chlorine atom, "Aryl" represents phenylene, and X represents a member selected from the group consisting of oxygen, —NH—, —NHCO—, —N=N—, —SO$_2$—,

and —CH$_2$—.

2. The dyestuff of the formula

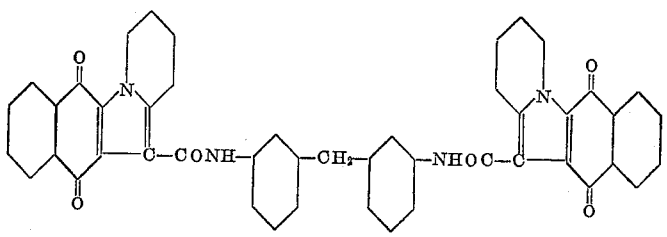

3. The dyestuff of the formula
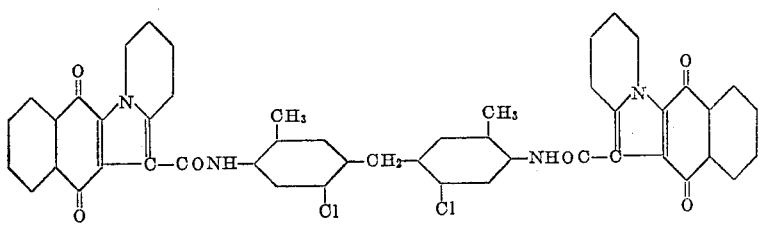
4. The dyestuff of the formula
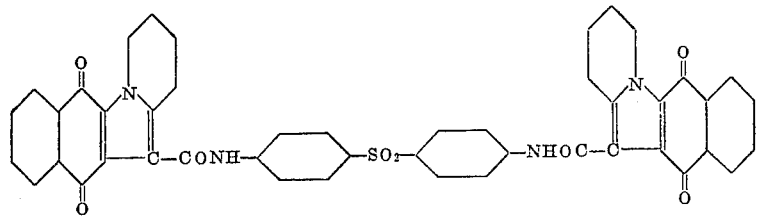
5. The dyestuff of the formula
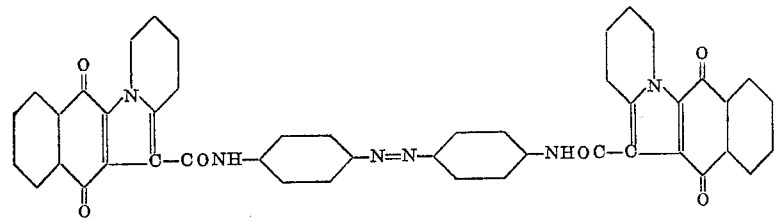
6. The dyestuff of the formula
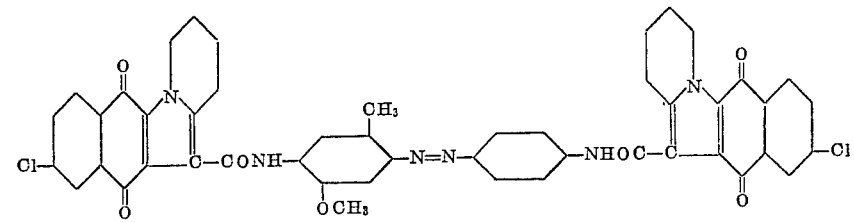
References Cited in the file of this patent
UNITED STATES PATENTS
2,772,274  Schmidt-Nickels et al. ____ Nov. 27, 1956
2,877,230  Lang et al. _____ Mar. 10, 1959